Figure 1:
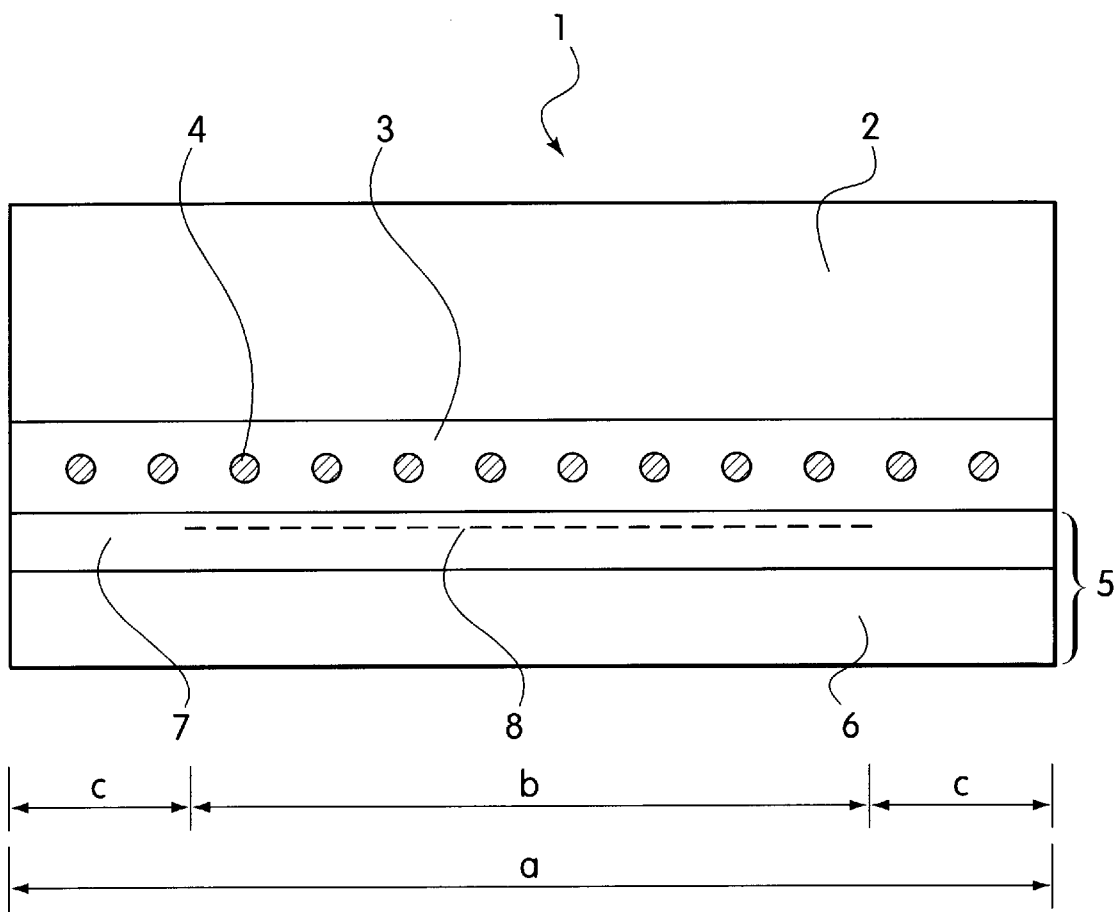

United States Patent

Reiner et al.

[11] Patent Number: 6,116,411
[45] Date of Patent: Sep. 12, 2000

[54] CONVEYOR BELT

[75] Inventors: Margit Reiner, Bad Blankenburg; Gernot Grosskreuz, Rudolstadt, both of Germany

[73] Assignee: Phoenix Aktiengesellschaft, Hamburg, Germany

[21] Appl. No.: 09/142,438

[22] PCT Filed: Mar. 4, 1997

[86] PCT No.: PCT/DE97/00389

§ 371 Date: Dec. 30, 1998

§ 102(e) Date: Dec. 30, 1998

[87] PCT Pub. No.: WO97/32801

PCT Pub. Date: Sep. 12, 1997

[30] Foreign Application Priority Data

Mar. 6, 1996 [DE] Germany ............................ 196 08 552
May 20, 1996 [DE] Germany ............................ 196 20 062

[51] Int. Cl.$^7$ .................................................. B65G 15/34
[52] U.S. Cl. ................................................................ 198/847
[58] Field of Search ................................................. 198/847

[56] References Cited

U.S. PATENT DOCUMENTS

| | | | |
|---|---|---|---|
| 2,793,150 | 5/1957 | Deaves | 198/847 |
| 5,328,023 | 7/1994 | Hinkelmann et al. | 198/847 |
| 5,766,421 | 6/1998 | Aufrecht | 198/847 X |
| 5,943,951 | 8/1999 | Muellner et al. | 198/847 X |

FOREIGN PATENT DOCUMENTS

| | | | |
|---|---|---|---|
| 1 248 543 | 8/1967 | Germany . | |
| 24 25 465 | 3/1975 | Germany . | |
| 2831741 | 2/1979 | Germany | 198/847 |
| 2853691 | 6/1980 | Germany | 198/847 |
| 41 13 626 A1 | 10/1992 | Germany . | |
| 41 13 627 A1 | 10/1992 | Germany . | |
| 44 33 755 A1 | 3/1996 | Germany . | |
| 7576 | 1/1977 | Japan | 198/847 |
| 261711 | 10/1990 | Japan | 198/847 |
| 522101 | 9/1976 | U.S.S.R. | 198/847 |

Primary Examiner—James R. Bidwell
Attorney, Agent, or Firm—Collard & Roe, P.C.

[57] ABSTRACT

The invention concerns a conveyor belt comprised of a load-carrying side and a backing side made of elastomer material as well as a traction support area made of steel cables or cords located between the load-carrying side and the backing side. In one variation, the backing side consists of an outer wearing coat which has a rebound resilience of at least 70% and of an intermediate layer between the traction support area and the wearing coat, where a reflector is present within the intermediate layer. In a further variation, the backing side consists of a wearing coat which also has a rebound resilience of at least 70%, with a reflector within the wearing coat, but without an intermediate layer. In both variations, the reflector is advantageously arranged in direct proximity to the traction support area, where the width of the reflector takes up a maximum of 80% of the entire width of the conveyor belt, at an essentially equal distance from the outer edges.

14 Claims, 2 Drawing Sheets

CONVEYOR BELT

DESCRIPTION

The invention relates to a conveyor belt comprising a load-carrying side and a backing side made from elastomer material, i.e., rubber or rubber-like material, as well as a traction support area made from steel cables or steel cords located between the load-carrying side and the backing side.

The energy consumption of belt conveyor installations can be influenced by the design of the conveyor belt. This is very important especially in installations where energy carriers are recovered and large streams of material are transported over large distances, so that such belt carriers are required to have high driving capacities. A number of tests have been carried out in the past for the purpose of reducing the kinetic resistance of belt carrier installations. Reference is made in this regard particularly to the following literature:
(1) DE-A-41 13 626/DE-A-41 13 627 (Technical University Dresden)
(2) DE-A-44 33 755 (Phoenix AG)
(3) Hager, Hintz, Pattensen: Influence of the Belt structure on the Energy Consumption of Conveyor belts—Trade Publication "Braunkohle", 9/93
(4) Hager, Hintz: Influence of the Belt Material and Belt Construction on the Energy Consumption of Conveyor Installations—Trade Conference of the German Rubber Association ("DKG") on 10-01-1992 in Fulda.

The kinetic resistance is determined by both the type of support rollers selected and their constellation (i.e., shape of the trough of the belt) and the conveyor belt as such.

Now, the problem against the background of the state of the art cited above is to reduce the loss of inner energy (hysteresis) of the conveyor belt running up on the load-carrying roller and acting on the latter, so that the damping energy is reduced there. Furthermore, an optimum is to be obtained with respect to the resetting force or energy of the conveyor belt as it travels across the load-carrying rollers.

Now, according to the invention, the solution to said problem consists in that
the backing side consists of an outer wearing coat, which has a rebound resilience of at least 70%, and an intermediate layer between the traction support area and the wearing coat, whereby a reflector which is steel wire mesh consisting of warp and weft wires, is present within the intermediate layer (variation A); or
the backing side consists of a wearing coat having a rebound resilience of at least 70% as well, whereby a reflector, which is a steel wire mesh consisting of warp and weft wires is arranged within the wearing coat but no intermediate layer is present between the traction support area and the wearing coat variation B.

The value of rebound resilience specified above relates to room temperature with either variation.

The wearing coat and the intermediate layer each usefully are 1-layer constructions, whereby particularly the wearing coat according to variation A has a greater thickness than the intermediate layer.

Concerning the reflector as defined by the invention, which in context with the problem here on hand does not have the function of a slit protection (DE-B-24 25 465; U.S. Pat. No. 2,793,150), the following parameters usefully apply:

The warp and weft wires each have about the same high tensile strength, in particular of up to 300 N/mm². Furthermore, the warp and weft wires exhibit about the same elongation property. The steel wire mesh has a mesh aperture of up to 2 mm maximum, whereby the warp and weft wires have a diameter of up to 1.2 mm at the most. Furthermore, the warp and weft wires are advantageously galvanized, which increases the rubber friendliness (i.e., the adhesive capacity versus the elastomeric material).

The reflector is arranged in direct proximity to the traction support area. It is advantageous in connection with this constellation if the type of weave of the steel wire mesh described above is a twill weave or calico weave.

The width of the reflector takes up a maximum of 80%, in particular a maximum of 75% of the total width of the conveyor belt, with substantially an equal spacing from the outer edges.

The reflector extends over the total length of the conveyor belt.

The invention is now explained in greater detail in the following with the help of exemplified embodiments and by reference to schematic cross sectional representations.

Figure 2:
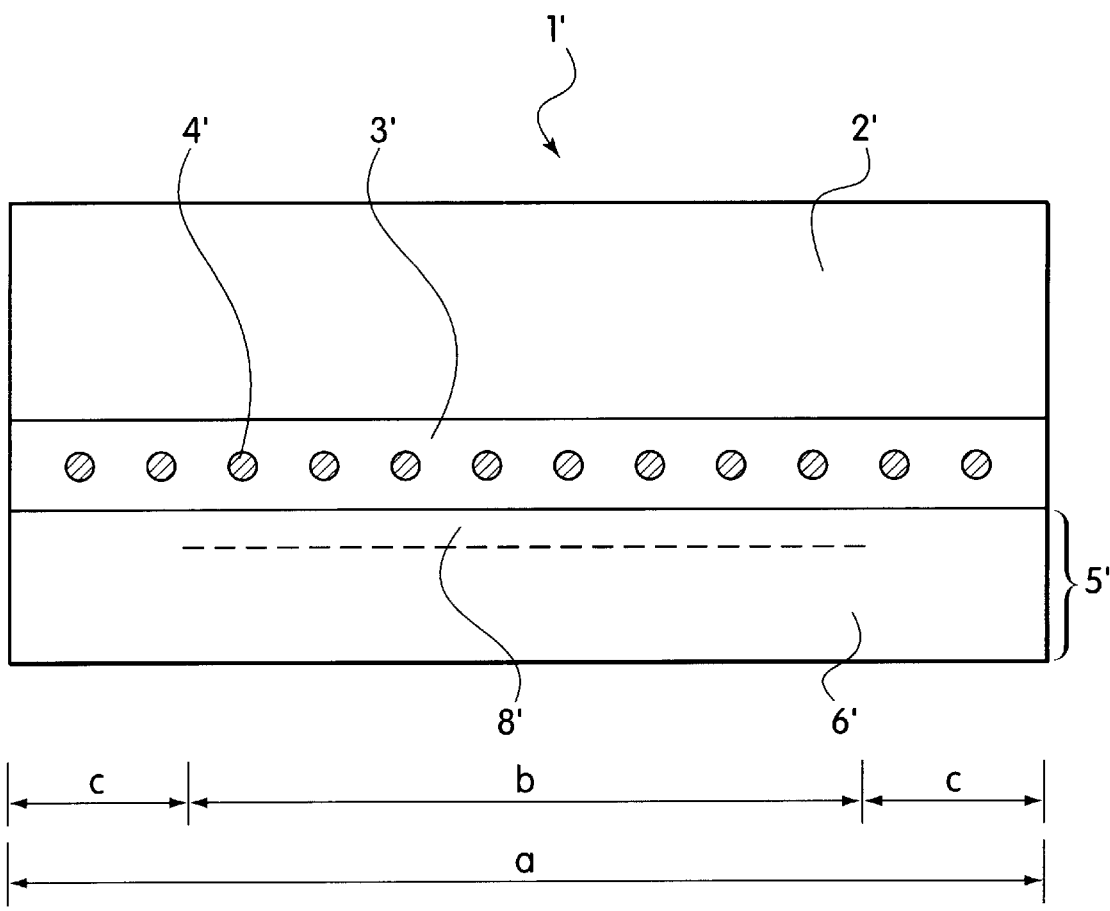

In the drawing,
FIG. 1 shows the backing side according to variation A.
FIG. 2 shows the backing side according to variation B.
The following list of reference numerals applies in connection with said figures:

| | |
|---|---|
| 1, 1' | Conveyor belt |
| 2, 2' | Load-carrying side |
| 3, 3' | Traction support area |
| 4, 4' | Steel cables or steel cords |
| 5, 5' | Backing side |
| 6, 6' | Wearing coat |
| 7 | Intermediate layer |
| 8, 8' | Reflector |
| a = | Width of conveyor belt |
| b = | Width of reflector |
| c = | Spacing of reflector from the outer edges |

According to FIG. 1, the backing side (5) consists of an outer wearing coat (6) and an intermediate layer (7) arranged between the traction support area (3) and the wearing coat, whereby a reflector (8) is present within the intermediate layer, said reflector being located in the direct proximity of the traction support area. Width "b" of the reflector (8) takes up a maximum of 80%, in particular a maximum of 75% of the total width "a" of the conveyor belt, with substantially an equal spacing "c" from the outer edges.

According to FIG. 2, the backing side (5') consists of a wearing coat (6'), whereby a reflector (8') is arranged here within the wearing coat without the presence of an intermediate layer between the traction support area (3') and the wearing coat (6'). The same arrangement principle as shown in FIG. 1 applies otherwise with respect to the reflector.

What is claimed is:
1. A conveyor belt (1') comprising
a load-carrying side (2') and a backing side (5') made from elastomeric material, as well as
a traction support area (3') made from steel cables or steel cords (4') arranged between the load-carrying side and the backing side, characterized in that
the backing side (5') consists of a wearing coat (6') having no intermediate layer but having a rebound resilience at room temperature of at least 70%, whereby a reflector (8'), which is a steel wire mesh consisting of warp and weft wires, is arranged within the wearing coat.
2. A conveyor belt (1) comprising
a load-carrying side (2) and a backing side (5) made from elastomeric material, as well as
a traction support area (3) arranged between the load-carrying side and the backing side and made from steel cables or steel cords (4), characterized in that the backing side (5) consists of an outer wearing coat (6), which has a rebound resilience at room temperature of at least 70%, and an intermediate layer (7) arranged between the traction support area (3) and the wearing coat, whereby a reflector (8), which is a steel wire mesh consisting of warp and weft wires, is present within the intermediate layer.

3. The conveyor belt according to claim 2, characterized in that the wearing coat (6, 6') is single-layered.

4. The conveyor belt according to claim 2, characterized in that the intermediate layer (7) is single-layered.

5. The conveyor belt according to claim 2, characterized in that the wearing coat (6) has a greater thickness than the intermediate layer (7).

6. The conveyor belt according to claim 2, characterized in that the reflector (8, 8') is arranged within the direct proximity of the traction support area (3, 3').

7. The conveyor belt according to claim 2, characterized in that the reflector (8, 8') extends over the total length of the conveyor belt.

8. The conveyor belt according to claim 2, characterized in that the "warp" and weft wires have approximately the same high tensile strength, in particular of up to 300 N/mm$^2$.

9. The conveyor belt according to claim 2, characterized in that the warp and weft wires have approximately the same elongation behavior.

10. The conveyor belt according to claim 2, characterized in that the steel wire mesh has a mesh aperture of up to 2 mm at the most.

11. The conveyor belt according to claim 2, characterized in that the warp and weft wires each have a diameter of up to 1.2 mm at the most.

12. The conveyor belt according to claim 2, characterized in that the warp and weft wires are galvanized.

13. The conveyor belt according claim 2, in particular in association with claim 6, characterized in that the type of weave of the steel wire mesh is a twill weave or a calico weave.

14. The conveyor belt according to claim 2, characterized in that width "b" of the reflector (8, 8') takes up a maximum of 80%, in particular a maximum of 75% of the total width "a" of the conveyor belt, with a substantially equal spacing from the outer edges.

* * * * *

UNITED STATES PATENT AND TRADEMARK OFFICE
CERTIFICATE OF CORRECTION

PATENT NO. : 6,116,411
DATED : September 12, 2000
INVENTOR(S) : Reiner et al (PCT)

It is certified that error appears in the above-identified patent and that said Letters Patent is hereby corrected as shown below:

In column 3, (line 2 of claim 8), line 22, change ""warp"" to --warp-- .

(without quotation marks)

Signed and Sealed this

Twenty-fourth Day of April, 2001

Attest:

NICHOLAS P. GODICI

Attesting Officer

Acting Director of the United States Patent and Trademark Office